United States Patent [19]
Landfors et al.

[11] Patent Number: 5,961,803
[45] Date of Patent: Oct. 5, 1999

[54] LEACHING PROCESS

[75] Inventors: Johan Landfors, Ljungaverk; Roy Hammer-Olsen; Kimona Häggström, both of Sundsvall, all of Sweden

[73] Assignee: Eka Chemicals AB, Bohus, Sweden

[21] Appl. No.: 08/677,290

[22] Filed: Jul. 9, 1996

Related U.S. Application Data

[60] Provisional application No. 60/001,287, Jul. 20, 1995.

[30] Foreign Application Priority Data

Jul. 12, 1995 [SE] Sweden ................................. 9502583

[51] Int. Cl.$^6$ ............................. C25B 7/00; C02F 1/461; B01D 17/06; D21C 5/00
[52] U.S. Cl. .......................... 204/529; 205/747; 205/748; 205/749; 205/750; 210/748; 162/50; 162/192
[58] Field of Search ..................................... 205/747, 748, 205/749, 750; 210/748; 162/50, 192; 204/529

[56] References Cited

U.S. PATENT DOCUMENTS

| | | | |
|---|---|---|---|
| 3,684,672 | 8/1972 | Iwahashi et al. | 204/128 |
| 3,833,462 | 9/1974 | Moy et al. | 162/29 |
| 4,000,034 | 12/1976 | Partridge | 162/30 K |
| 4,277,447 | 7/1981 | Chambers et al. | 423/165 |
| 4,391,680 | 7/1983 | Mani et al. | 204/98 |
| 4,891,067 | 1/1990 | Rappas et al. | 75/101 R |
| 5,139,632 | 8/1992 | Chlanda et al. | 204/182.4 |
| 5,352,332 | 10/1994 | Maples et al. | 162/30.1 |
| 5,415,751 | 5/1995 | Adachi et al. | 204/182.4 |
| 5,567,293 | 10/1996 | Paleologou et al. | 204/523 |

FOREIGN PATENT DOCUMENTS

| | | |
|---|---|---|
| 989558 | 5/1976 | Canada . |
| 1059271 | 7/1979 | Canada . |
| 0 653 511 | 5/1995 | European Pat. Off. . |
| 8022051 | 2/1980 | Japan . |
| 1112617 | 5/1968 | United Kingdom . |
| WO 94/04747 | 3/1994 | WIPO . |
| WO 95/06775 | 3/1995 | WIPO . |

OTHER PUBLICATIONS

MPEP pp. 600–643 to 600–652, No Date Available.
European Search Report, dated Oct. 22, 1996.
Abstract, JP 2145885, Jun. 5, 1990.
*Pulp & Paper Canada* (*Chemicals*) 91:5 (1990), Chloride and potassium in the kraft chemical recovery cycle, pp. 55–62 No Month Available.
*Pulp & Paper Magazine of Canada*, Nov., 1956, pp. 171–173, The Separation of Sodium Chloride from Precipitator Salt–Cake No Month Available.

*Primary Examiner*—Kathryn Gorgos
*Assistant Examiner*—Edna Wong
*Attorney, Agent, or Firm*—Ralph J. Mancini

[57] ABSTRACT

An increasing problem with the pulping chemical recovery system, is the presence of chloride and potassium in the recovery boiler. Chloride and potassium increase inter alia the stickiness of carryover deposits and dust particles to the recovery boiler tubes, which accelerate fouling, corrosion and plugging of the recovery boiler. As the environmental legislation becomes more stringent, the degree of system closure increases. The present invention relates to a process by which the collected precipitator dust is leached, at a temperature exceeding 50° C., for a residence time sufficient to get a chloride and potassium enriched leach solution and to remove at least a part of the content of metal ions in a solid phase. Said leach solution is electrochemically treated, preferably in an electrodialysis cell, in order to remove at least a part of the chloride and potassium therein. By the present process, the problem of sticky deposits in the recovery boiler can be substantially reduced. This means an improved energy efficiency as well as a higher degree of recovery of the pulping and bleaching chemicals.

14 Claims, 1 Drawing Sheet

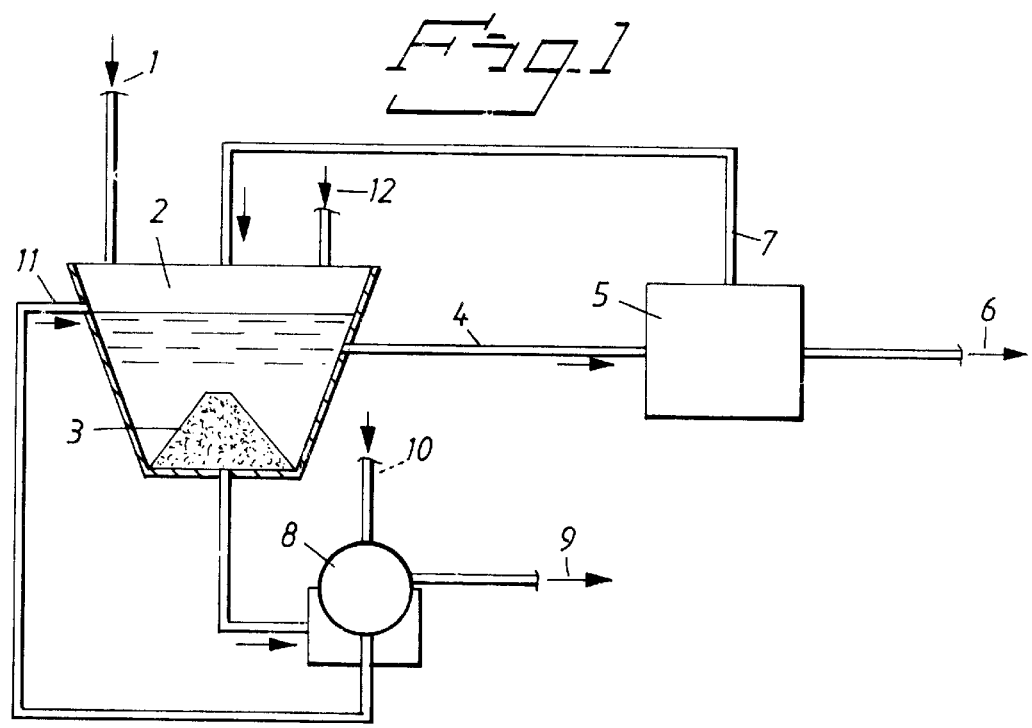
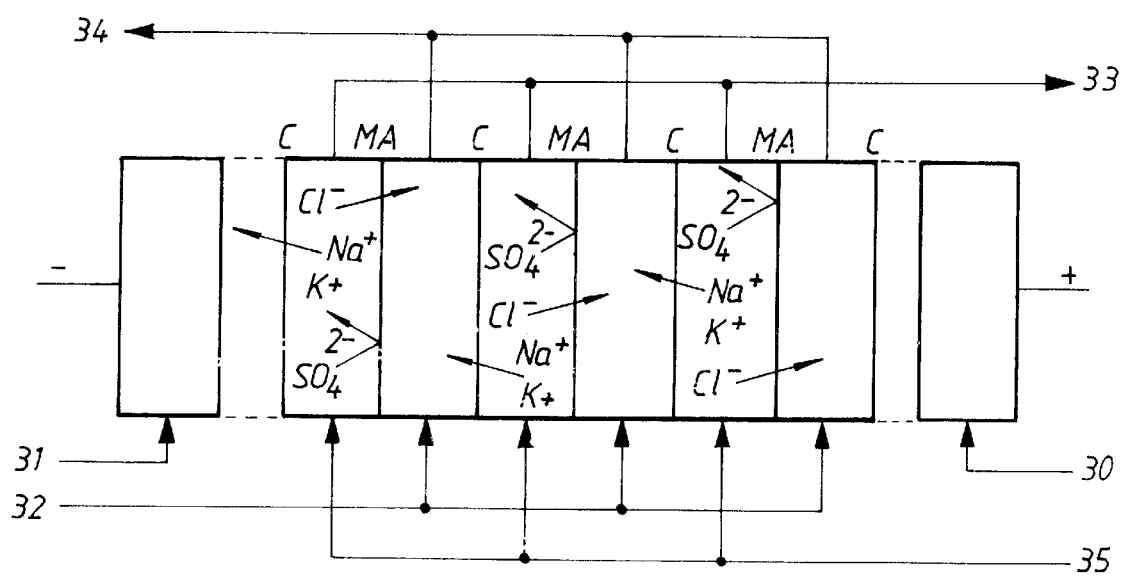

LEACHING PROCESS

The present case claims priority of Swedish priority application No. 9502583-9 filed Jul. 12, 1995 and benefit of U.S. provisional patent application Ser. No. 60/001,287 filed Jul. 20, 1995.

The present invention relates to an environmentally friendly process for reducing the content of chloride and metal ions in a liquid inventory of a chemical pulp mill.

In the production of a chemical pulp, chips of lignocellulose-containing material are cooked in an alkaline or acid aqueous solution. This cooking liquid contains inorganic pulping chemicals to improve the dissolution of lignin. The cooking is normally carried out at a temperature above 100° C. to reduce the residence time for the pulp produced. Therefore, the cooking is carried out in a pressure vessel known as a digester.

BACKGROUND OF THE INVENTION

In the production of sulphate pulp, soda pulp and sulphite pulp with an alkali metal as a base, normally sodium, it is possible to recover the inorganic pulping chemicals in the spent liquor leaving the digester. It is vital both to economy and environment to recover these pulping chemicals to the largest possible extent. This is achieved in the pulping chemical recovery system, which essentially transfers the used inorganic pulping chemicals into a chemical state, where they can be re-used for cooking.

An essential part of the recovery system is the recovery boiler, where the spent liquor is burned. Normally, make-up chemicals are added to the spent liquor before the recovery boiler to make up for the chemicals lost during cooking and recovery. The spent liquor is sprayed into the lower part of the boiler, previously at a relatively low temperature to remove free water. Modern recovery boilers operate at a high temperature to reduce the content of sulphur in the flow gases leaving the boiler. Higher up in the boiler, gases and vapours of light hydrocarbons and decomposition products are volatilized. This is known as pyrolysis. Then, the pyrolysis products are burned after mixing with air or oxygen. The solid carbon-based residue which remains after complete pyrolysis of the organics is then heterogeneously burned. The solid particles formed are collected as a dust in precipitators at the top of the recovery boiler, to reduce the release of solid material to the surrounding atmosphere.

A substantial and increasing problem with the pulping chemical recovery system, is the presence of chloride and potassium in the spent liquor entering the recovery boiler. These elements tend to reduce the capacity of the recovery boiler to produce useful chemicals. Thus, chloride and potassium increase the stickiness of carryover deposits and dust particles to the recovery boiler tubes, which accelerate fouling and plugging in the upper part of the recovery boiler. Chloride also tend to increase the corrosion rate of superheater tubes.

Chloride and potassium are concentrated in the dust formed during the combustion of spent liquor in the recovery boiler. The dust is collected in dry-bottom or wet-bottom electrostatic precipitators. The dust mainly consists of sodium and potassium salts, where sulphate, carbonate and chloride are the dominant anions. The amount of dust corresponds to about 5 to about 15% by weight of the sodium entering the recovery boiler, which corresponds to about 50 to about 150 kg dust per ton pulp, if the dust is calculated as sodium sulphate.

Today, normally all of the precipitator dust collected and withdrawn from the recovery boiler is recycled to the flow of spent liquor to be burned in the boiler. When the concentration of chloride or potassium is too high, a portion of the precipitator dust is withdrawn from the system and discharged or deposited.

The content of chloride in the spent liquor can be very high for coastal mills, if the raw material consists of logs floated in seawater. The content is moderate in mills using caustic make-up contaminated with sodium chloride or in mills that at least partially recover spent bleach liquids from stages using chlorine-containing bleaching agents. As the environmental legislation becomes more stringent regarding pulp mill discharges to air and water, the degree of system closure increases. This means that even a small input of chloride becomes a severe problem, unless the content can be controlled by purging the system in some environmentally acceptable way.

A further problem in the chemical recovery system, in the treatment of spent liquors and recirculation of the purified process liquids, is the content of metal ions. In the treatment of the spent liquors, especially when using electrochemical methods, the metals are harmful. Metal ions such as calcium (Ca) and magnesium (Mg) may precipitate on the membranes and cause damage on the membranes. Ca and Mg may also form sparingly soluble salts which are clogging the compartments of the cell, thus leading to an interruption in the production due to restoration of the cells.

Several methods have been proposed to overcome the problem with chloride and potassium build-up in pulping chemical recovery systems. One example is evaporation of cooking liquid to recrystallize sodium chloride and potassium chloride. Also known is leaching of precipitator dust and discarding the leach liquid rich in chloride.

According to Tran et al., Pulp Paper Canada 91(5): T185–T190 (1990), the easiest and most effective way to control chloride, as well as potassium, in the chemical recovery cycle today, is by directly discarding the precipitator dust. Therefore, still the most commonly used method is removal of part of the precipitator dust from the system, and subsequent deposition on land or discharge to water. However, this will not only be environmentally unacceptable, but also result in a loss of valuable cooking chemicals.

U.S. Pat. No. 5,352,332 discloses a process for recycling bleach plant filtrate. Precipitator dust is collected and treated by leaching with water or by evaporation crystallization from a water solution. The thus formed salt solution is discharged to sewer or recovered for its chlorine value.

WO-A1-9404747 discloses a process, in which the content of chloride in a recovery system for pulping chemicals can be reduced. The process comprises collecting precipitator dust, dissolving the dust in water to produce an aqueous solution of precipitator dust, whereupon said aqueous solution is electrolysed in a cell for production of chlorine or hydrochloric acid in the anolyte.

JP-A-55022051 discloses a process for reduction of chloride where precipitator dust is washed with a Glauber's salt solution, whereafter a part of the washing solution is treated by electrodialysis to remove chloride.

CA 1059271 discloses a process for reduction of chloride in a pulp mill recovery system. Precipitator dust is leached with hot water at a temperature of 60–100° C. Chloride is precipitated from the leached solution by cooling crystallization. Solid sulphate is recycled to the black liquor. Acid (sulphuric acid) is added in the leaching to lower the pH in order to precipitate sulphate.

BRIEF DESCRIPTION OF THE DRAWINGS

FIG. 1 shows a process whereby dust (1) formed in a recovery boiler and collected in a dry bottom electrostatic precipitator, is brought to a leaching step (2).

FIG. 2 shows the preferred embodiment of the invention where an electrodialysis cell is employed.

SUMMARY OF THE INVENTION

The present invention relates to a process by which the content of chloride, potassium and other metal ions in a recovery system for pulping chemicals can be reduced. The process comprises bringing spent liquor to a recovery boiler, burning said spent liquor optionally together with make-up chemicals, collecting precipitator dust formed, leaching the precipitator dust with a leaching liquid at a temperature exceeding 50° C., for a residence time sufficient to form a chloride and potassium enriched leach solution and to remove at least a part of the content of metal ions in a solid phase. The thus formed solid phase, comprising inter alia metal compounds and organic material, is separated from the chlorine and potassium enriched leach solution, whereupon said leach solution is electrochemically treated, preferably in an electrodialysis cell in order to remove at least a part of the chloride and potassium therein.

BACKGROUND OF THE INVENTION

By the present process, the problem of sticky deposits in the recovery boiler can be substantially reduced. This means an improved energy efficiency as well as a higher degree of recovery of the pulping chemicals.

Another advantage of the present process is the possibility to reduce the content of potassium in the liquid inventory and more particularly in the spent liquor entering the recovery boiler.

A further advantage is the reduction of metal ions in the recirculation liquid, which is important when using electrolysis in the treatment of waste liquids.

The process is energy efficient, has low investment costs and offers a possibility to remove chloride, potassium and metal ions, with a minimum loss of valuable substances like sodium and sulphate. In the electrochemical embodiment, the cells can be operated at very high current densities, which result in low investment cost for cells and membranes.

By the present process, chloride may be removed from the precipitator dust by leaching with a saturated, or near saturated aqueous sulphate solution. Similar result might be possible to reach by leaching with water, but with higher loss of precipitator dust.

Potassium and sodium are alkali metals present in the spent liquors.

The present invention can be used in the production of a chemical pulp and especially for production of a sulphate pulp, soda pulp or sulphite pulp with an alkali metal as base. A kraft pulp is a special type of sulphate pulp, where the pulp is under-cooked to produce a dark-coloured pulp of exceptional strength. The present invention can also be used in the production of sulphate, soda or sulphite pulps with an alkali metal as base, where the cooking processes have been modified, combined or extended compared to the normal pulping techniques. Suitably, the present process is applied where the recovery system for pulping chemicals containing an alkali metal is a sulphate recovery system. Preferably, the recovery system for pulping chemicals containing an alkali metal, is a kraft recovery system.

A liquid inventory is the total quantity of various liquids in a mill, with varying contents of active or activatable cooking liquid components. The liquid inventory of a sulphate mill, mainly consists of white liquor, black liquor, green liquor and spent liquor entering the recovery boiler. The spent liquor to be burned in the present process, is a used cooking liquid withdrawn from a digester, optionally with added make-up chemicals.

The amount of precipitator dust formed depends mainly on the temperature in the boiler, the ratio between sodium and sulphur in the spent liquor and the raw material and sulphidity of the cooking process. A high temperature in the lower part of the boiler to reduce the sulphur content in the flow gases, increases the amount of dust formed.

With the present process, all or a portion of the precipitator dust collected and withdrawn from the recovery system is leached with a leaching liquid and treated electrochemically. The proportion between the amount of dust electrochemically treated and recycled directly to the flow of spent liquor, can be chosen with respect to the initial content of chloride and potassium ions in the dust. The composition of precipitator dust formed in recovery boilers vary considerably depending on type and origin of wood, cooking process, purity of make-up chemicals, temperature in the boiler, type of precipitator etc. However, irrespective of these factors the dust mainly consists of sodium and potassium salts, where sulphate, carbonate and chloride are the dominant anions. A typical composition of precipitator dust from a kraft recovery system is $Na_2SO_4$ 80–85% by weight, $Na_2CO_3$ 2–8% by weight, NaCl 2–8% by weight, $NaHSO_4$+$Na_2S_2O_7$<2% by weight, $K_2SO_4$ 5–10% by weight, $K_2CO_3$ 0.5–1% by weight, KCl<1% by weight, metal ions such as Ca, Fe, Mg, P, Si, Mn, Zn, Mo<1% by weight and organic material<1% by weight.

The leaching should be performed at a temperature exceeding 50° C., in order to reach a maximum amount of potassium chloride in the leach solution and a minimum amount in the separated solid phase. Below 50° C. the content of potassium chloride in the leach solution will be poor, and most of the potassium will remain in the solid phase, which is unfavourable. The upper temperature is limited by practical reasons. There is generally no advantages of performing the leaching above 100° C. The leaching is preferably performed in the range from above 50° C. up to about 90° C., suitable from about 60° C. up to about 80° C., and most preferably from about 65° C. up to about 75° C.

The residence time of the leaching is preferably at least about 1 minute. The upper residence time is not critical, but have to be set by process-technical reasons. However, any improved leaching results have not been observed exceeding about 1080 minutes. The residence time is preferably in the range from about 5 minutes up to about 1080 minutes, suitably from about 5 minutes up to about 180 minutes.

The chloride and potassium enriched leach solution is separated from the solid phase of the leached precipitator dust, by e.g. filtration, centrifugation, sedimentation etc. The leach solution can be filtered before the electrochemical treatment to remove undissolved, precipitated or flocculated compounds. By this preferred filtering, especially the content of calcium is reduced, but also the content of phosphate, aluminium and silicon are reduced to a considerable extent. In filtering the solution, mainly flocculated organic compounds and precipitated inorganic compounds are removed. The filter can be of any conventional type, e.g. a drum, belt or table filter with or without vacuum being applied.

According to a preferred embodiment, the separated solid phase can be further treated, e.g. by filtering and addition of water, in order to get a second solid phase comprising mainly of metal compounds, metal ions, organics, sodium sulphate and carbonate. The filtrate, mainly water, separated from the second solid phase may be recirculated to the leaching step. The thus formed second solid phase can be further treated in order to produce acid and alkali, and to separate compounds of silicon, phosphate, metal ions and other harmful compounds for the process. The thus separated compounds can be deposited, recycled or reused e.g. for the production of metals. The remaining solid phase is preferably added to the black liquor, and subsequently incinerated in the recovery boiler.

Inorganic or flocculated organic impurities, are suitably precipitated and separated as solid phase in the leaching step. Organic material comprises residues of e.g. lignin, resin and fibres. Calcium, magnesium, silicon, phosphate, aluminium, iron and manganese are the most important examples of sparingly soluble inorganic impurities present as cations in the solution. The content in the leach solution of these cations can be reduced down to an acceptable level by raising the pH sufficiently, at which inorganic compounds remain in the solid phase, mainly metal hydroxides such as $MgOH_2$ and also carbonate, e.g. $CaCO_3$.

The pH in the leaching step can be in the range from about 6 up to about 14, suitably from about 7 up to about 12 and preferably from about 10 up to about 12. The pH can be adjusted by adding sodium hydroxide. Below a pH about 6, $CO_2$ will be formed, inter alia from the carbonate.

The added leaching liquid may comprise of water, or water solutions of sulphate or carbonate. Added sulphate may be alkali metal, preferably sodium sulphate, suitably at least a part from a recirculated and depleted chloride solution from the electrochemical treatment. If water is added, it can be either fresh water or purified process water.

Calcium is detrimental to the cells, in the preferred electrochemical cell treatment. Carbonate may also be added to the leaching, especially if the carbonate content in the precipitator dust is low or zero, in order to precipitate metal ions, preferably calcium. Carbonate may also be added to the dust, prior to the leaching, or to the recycled chloride depleted solution. The added amount of carbonate depends on the precipitator dust composition and additional carbonate is added to reach a total amount of carbonate. There is generally no advantages exceeding a total amount of 10% by weight of carbonate. The amount of carbonate added is preferably in the range from about 0 up to about 10% by weight leaching solution content, suitably from about 2 up to about 10% by weight, most preferably from about 4% up to about 10% by weight. Carbonate is preferably added in solid form as sodium carbonate.

When a water solution of sulphate is added as a leaching liquid, sodium sulphate may be at least partially precipitated and separated in the solid phase, along with the separation of metals and organics.

After the leaching step, the chloride enriched leach solution is dechlorinated by a electrochemical treatment.

According to an embodiment, a nanofiltration treatment can be carried out by filtering the leach solution before the electrochemical treatment, at high pressure, through a filter, which is more selective for monovalent ions such as $Cl^-$ and $K^+$, than larger ions e.g. sulphate (divalent). The filters are preferably negatively charged in order to repel e.g. sulphate ions. Thus, a chloride and potassium enriched concentrate is separated from a sulphate concentrate, depleted of chloride, and further brought to the electrochemical treatment. The concentrated sulphate solution may be recycled to the leaching step. A nanofiltration treatment is also possible, for further purification, on the diluate or on the concentrate from the electrochemical treatment.

The electrochemical treatment is preferably carried out by electrodialysis by transferring the chloride ions over an anion selective membrane by applying an electrical current perpendicular to the membrane surface. Dissolved cations are transferred in the opposite direction over a cation selective membrane. A large number of alternating anion and cation selective membrane can be arranged in a stack between an anode and a cathode to give diluate and concentrate chambers. The treatment in the cell gives a salt solution with chloride as the dominant anion and a precipitator dust solution which is depleted with respect to chloride. The electrochemical treatment is preferably performed in a stack with anion selective membranes which are more selective for monovalent anions, e.g. chloride, compared to divalent anions, e.g. sulphate.

The pH is preferably adjusted before the leach solution reaches the electrochemical treatment, preferably with sodium hydroxide, hydrochloric acid or sulphuric acid. The pH in the electrochemical treatment should preferably not exceed about and not be below about 2, in order not to damage the membranes.

Preferably the desalination is performed by electrodialysis of the resulting salt solution, normally essentially or entirely consisting of inorganic materials, to form a diluate with reduced salt concentration and a first electrodialysis concentrate of the salts in solution. The diluate, mainly comprising sodium sulphate, can be at least partly recycled to the leaching step. The diluate may also be recycled to other places in the pulp mill. The first electrodialysis concentrate of feed leach solution mainly comprising harmless inorganic salts like sodium chloride and potassium chloride, can be sewered to the sea. It is, however, possible to recover the inorganic salts, especially if there are mainly chloride-containing salts, and purify these further, e.g. to produce acid and alkali, or for use in a plant for the production of sodium chlorate aimed for bleaching. In this case the pulp mill may be closed in a very broad sense.

It is possible to obtain a 3 M chloride solution with only about 0.1 to about 0.3 M sulphate, by an electrodialysis treatment with a current efficiency for chloride removal between 80–90%. The concentrate may comprise from about 5 up to about 200 g/l sodium chloride and from about 0.5 g/l sulphate up to saturation.

Part or all of the chloride depleted solution can also be electrochemically treated in a membrane cell to give acid and caustic which can be used as internal supply for adjustment of pH in the mill.

The electrodes used in the electrochemical treatment, can be of the conventional type. The anode and the cathode may be made of the same material. The material of the cathode may be steel or nickel, suitably nickel, graphite, titanium, coated titanium or activated nickel. Suitable anodes are made of lead, graphite, titanium, coated titanium, lead oxides, tin oxide, tantalum or titanium, or combinations thereof.

The temperature in the cells should preferably not exceed 50° C. since the membranes can be damaged at temperatures beyond 50° C. But the membranes in the future may withstand temperatures exceeding 50° C. Thus, the limit is not critical but set of technical reasons.

The current density may be in the range from about 0.2 up to about 10 $kA/m^2$, suitably in the range from 0.5 up to 5 $kA/m^2$ and preferably in the range from 1 up to 3 $kA/m^2$.

The current efficiency for removal of chloride should be maintained above about 50%. The current efficiency is suitably maintained in the range from about 55 up to about 100% and preferably in the range from about 65 up to about 100%.

An embodiment of the process of the present invention will now be described in more detail with reference to figures. FIG. 1 shows a schematic description of an electrochemical plant where chloride and potassium are removed from precipitator dust. FIG. 2 shows an example of a flow-chart of an electrodialysis cell.

FIG. 1 shows roughly a process where dust (1), formed in a recovery boiler and collected in a dry-bottom electrostatic precipitator, is brought to a leaching step (2). A solid phase (3) is separated from a chloride, potassium and sulphate enriched leach solution (4). The leach solution is preferably further brought to an electrodialysis cell (5). The electrodialysis treatment result in a chloride and potassium enriched solution (6) which is separated and preferably brought to further treatment. The chloride and potassium depleted solution (7), enriched on inter alia sodium sulphate, may be recirculated to the leaching step (2). The separated solid phase (3) in the leaching, may be subjected to a treatment (8), e.g. by filtration, in order to form a second solid phase (9) comprising metals, carbonate, sulphate and organics. Additional water (10) may also be added in the treatment step (8). The liquid (11), mainly water, can be recirculated to the leaching step (2). In the leaching step additional carbonate may be added (12). Carbonate may also be added to the dust (1) or to the recycled solution (7).

FIG. 2 shows, in a preferred embodiment, an electrodialysis cell comprising at least one anion selective (MA) and one cation selective (C) membrane between an anode and a cathode. Normally the cell comprises multiple pairs of alternating anion selective and cation selective membranes between one anode and one cathode. The electrodialysis treatment is preferably performed in a stack with anion selective membranes which are more selective for monovalent anions (MA), e.g. chloride, compared to divalent anions, e.g. sulphate. Pairs of membranes form between said compartments with inlets and outlets for feeding liquids to and withdrawing liquids from said compartments. At the anode, an anode-solution (30) is added and at the cathode, a cathode-solution (31) is added. When the leach solution (32) is fed into the cell, the monovalent anions, e.g. chloride, will migrate through the monoanion selective membrane (MA) towards the anode and the cations, e.g. potassium and sodium ions, will migrate through the cation selective membrane (C) towards the cathode. The water solution will be depleted in salt, i.e. diluate (33). The chloride enriched concentrate (34) may be prepared in every other compartment. The diluate can be recycled at least partially to the leaching step or to other places in the pulp mill. The diluate can also be subjected to one or more desalination treatments, preferably to one or more electrodialysis treatments (35) for further reduction of the salt content therein. It is preferred to operate the electrodialysis stacks at a high current density to minimize the size and the investment cost. Electrodialysis can be performed in electrodialysis stacks operating in parallel and/or in series, and with liquid stream flow in parallel and/or in series.

The obtained diluate can be further desalinated in additional electrodialysis stacks operating at lower current densities to obtain a higher degree of desalination before a preferred recycle to the leaching step, or other liquors in the pulp mill.

The part of the diluate that is not recycled to the leaching can be desalinated in a separate electrodialysis stack to obtain an almost salt free diluate which can be recycled to a pulping process with no risk of getting problems with chlorides in the recovery system.

The concentrate (34) is suitably formed in every second chamber of the electrodialysis cell and to the chambers are added concentrated solution (32). The compartments may contain only chloride and harmless inorganic salts in concentrations from about 5 up to about 200 grams per liter and may be sewered, e.g. to the sea. It is, however, possible to recover the inorganic salts, which may be mainly chloride-containing salts, and purify these further for use e.g. in a plant for production of sodium chlorate for bleaching. In this case the pulp mill may be closed in a very broad sense. In case heavy metals or other metals harmful to the pulping process are present in the bleach effluent, these may be separated in the electrochemical stage and collected in the concentrate stream, where they may be removed by conventional brine purification processes, many of which are well-know e.g. from patents belonging to this applicant and others.

The conversion in the cells should preferably exceed about 50%.

The invention and its advantages are illustrated in more detail by the following examples which, however, are only intended to illustrate the invention and not to limit the same. The percentages and parts used in the description, claims and examples, refer to percentages by weight and parts by weight, unless otherwise specified.

EXAMPLE 1

80 g of a precipitator dust having a carbonate content of 6% by weight, was dissolved in 120 ml saturated sodium sulphate solution, with a content of 17 g/l sodium chloride solution. The temperature was 65° C. during the leaching. The slurry was stirred for 5 minutes and thereafter the solution was filtered. Tests have been made at pH 6, 10 and 12. At each pH-value tests have been made without any addition of extra carbonate, and with an addition of 4% by weight solid phase carbonate.

TABLE I

| Element | Addition of carbonate [%] | pH | Concentration [mg/l] | Reduction [%] |
|---|---|---|---|---|
| Calcium | 0 | 6 | 13,8 | 76 |
|  | 4 | 6 | 6,2 | 89 |
|  | 0 | 10 | 13,6 | 76 |
|  | 4 | 10 | 7,0 | 88 |
|  | 0 | 12 | 13,0 | 77 |
|  | 4 | 12 | 10,2 | 83 |
| Barium | 0 | 6 | 0,16 | 92 |
|  | 4 | 6 | <0,1 | 100 |
|  | 0 | 10 | 0,8 | 58 |
|  | 4 | 10 | 0,18 | 91 |
|  | 0 | 12 | 0,56 | 70 |
|  | 4 | 12 | 0,78 | 61 |
| Manganese | 0 | 6 | 1,8 | 92 |
|  | 4 | 6 | 0,06 | 100 |
|  | 0 | 10 | 1,8 | 91 |
|  | 4 | 10 | 0,06 | 100 |
|  | 0 | 12 | 0,7 | 97 |
|  | 4 | 12 | 0,98 | 96 |
| Silicon | 0 | 6 | 50 | 13 |
|  | 4 | 6 | 34 | 40 |
|  | 0 | 10 | 52 | 8 |
|  | 4 | 10 | 36 | 36 |
|  | 0 | 12 | 56 | 0 |
|  | 4 | 12 | 62 | 0 |

As evident from the Table, the content of Ca and other metals are reduced dramatically when carrying out the leaching step in accordance with the process of the present invention.

A test was also made with the above mentioned precipitator dust, at varying temperatures and residence time. The result is presented in Table II below.

TABLE II

| Residence time [minutes] | Temperature [C°] | Potassium concentration [g/l] |
|---|---|---|
| 5 | 30 | 20 |
|  | 67 | 42 |
|  | 80 | 49 |
|  | 82 | 48 |
| 180 | 33 | 27 |
|  | 65 | 35 |
|  | 65 | 44 |
|  | 82 | 54 |
|  | 83 | 56 |
| 1080 | 25 | 22 |
|  | 25 | 25 |
|  | 70 | 48 |

As evident from the Table above, the concentration of potassium increases with increasing temperature.

EXAMPLE 2

80 g of a precipitator dust having a carbonate content of 0% by weight, was dissolved in 120 ml saturated sodium sulphate solution, with a content of 17 g/l sodium chloride solution (pH 10). The temperature was 65° C. during the leaching. The slurry was stirred for 5 minutes and thereafter the solution was filtered. At each pH-value tests have been made without any addition of extra carbonate, and with an addition of 2, 6 and 10% by weight, solid sodium carbonate. When carbonate and dust were added, the pH increased as evident from Table III. In test 5 no carbonate was added, but instead the pH was raised to 12 by addition of alkali.

TABLE III

| Test | Addition of carbonate [% wt] | pH | Calcium filtrate conc. [mg/l] | Calcium reduction [% wt] |
|---|---|---|---|---|
| 1 | 0 | 10,4 | 7 | 94 |
| 2 | 2 | 11,2 | 4,8 | 96 |
| 3 | 6 | 11,6 | 5,6 | 95 |
| 4 | 10 | 11,6 | 3,6 | 97 |
| 5 | 0 + NaOH | 12 | 7,2 | 94 |

As evident from the Table, a substantial reduction of calcium can be made by adding carbonate. The reduction of calcium is dependent on the carbonate addition, not on the pH.

EXAMPLE 3

A test with electrodialysis of precipitator dust have been made in a lab cell equipped with monoanion and cation selective membranes. The initial concentrations of chloride, potassium and the current density in the diluate solution have been varied according to Table IV. The cell, with an electrode area of 1.72 dm$^2$, was equipped with ten membrane pairs. The anion selective membranes were monoanion selective membranes of type Neosepta ASV® and the cation selective membranes were of the type Neosepta CMV®. Platinum wires, one on each side of the ten membrane pairs, were used to measure the membrane voltage. Samples of the brine and diluate were taken every half hour and an analyses of chloride, sulphate sodium and potassium ion concentrations were done. The initial concentration of sodium chloride in the brine solution was about 0.5 M. The electrode rinse solution was 50 g/l sodium sulphate. The results are evident from Table IV.

TABLE IV

| Test | Current density [kA/m$^2$] | Cl$^-$ [%] | K$^+$ [%] | Current eff. % Cl$^-$ +/−10% | Current eff. % K$^+$ +/−5% |
|---|---|---|---|---|---|
| 1 | 1,5 | 8,7 | 4,8 | 90 | 20 |
| 2 | 0,3 | 2,9 | 2,8 | 93 | 20 |
| 3 | 2,5 | 9,7 | 2,2 | 100 | 10 |

As evident from Table IV chloride and potassium can be sufficiently removed over a wide range and with relatively high current efficiency.

We claim:

1. A process for reducing the content of metal ions and chloride in a recovery system for pulping chemicals, wherein said metal ions comprise potassium, said process comprising transferring spent liquor from a paper making process to a recovery boiler, burning said spent liquor to form a precipitator dust, and collecting the precipitator dust formed, wherein the precipitator dust is leached with a leaching liquid at a temperature exceeding 50° C. and at a pH above 6 to form a metal ions enriched leach solution and a solid phase comprising metal hydroxides and/or carbonates and organic material, wherein said solid phase is separated from the metal enriched leach solution, whereupon said leach solution is subjected to an electrodialysis treatment for removing at least a part of the metal ions therefrom.

2. The process of claim 1 wherein the pulping chemicals comprise sulphur.

3. The process of claim 1 wherein the pH at leaching is in the range of from about 7 to about 12.

4. The process of claim 1 wherein the precipitator dust is leached at a temperature in the range of from 60° C. to about 80° C.

5. The process of claim 1 wherein the leaching liquid, which comprises sodium sulphate and is depleted of chloride, is a recycle stream from the electrodialysis treatment.

6. The process of claim 5 wherein acid and alkali are produced from the chloride depleted leaching liquid.

7. The process of claim 5 wherein carbonate is added to the recycled leaching liquid.

8. The process of claim 1 wherein the electrodialysis cell comprises cation (C) and monoanion (MA) selective membranes.

9. The process of claim 8 wherein sodium chloride, potassium chloride or mixtures thereof is produced in the electrodialysis cell.

10. The process of claim 1 wherein sodium chloride, potassium chloride or mixtures thereof is produced in the electrodialysis cell.

11. The process of claim 1 wherein carbonate is added in the leaching step, or to the precipitator dust.

12. The process of claim 1 wherein the solid phase is subjected to a further treatment for producing a second solid phase.

13. The process of claim 12 wherein acid and alkali are produced from the second solid phase.

14. The process of claim 1 wherein acid and alkali are produced from the metal enriched leach solution.

* * * * *